US008626937B2

(12) United States Patent
Tomida (10) Patent No.: US 8,626,937 B2
(45) Date of Patent: Jan. 7, 2014

(54) SERVER DEVICE IN THIN-CLIENT SYSTEM

(75) Inventor: Takahiro Tomida, Hamura (JP)

(73) Assignee: Casio Computer Co., Ltd, Tokyo (JP)

( * ) Notice: Subject to any disclaimer, the term of this patent is extended or adjusted under 35 U.S.C. 154(b) by 121 days.

(21) Appl. No.: 13/303,282

(22) Filed: Nov. 23, 2011

(65) Prior Publication Data

US 2012/0136924 A1     May 31, 2012

(30) Foreign Application Priority Data

Nov. 30, 2010  (JP) .................................. 2010-267483

(51) Int. Cl.
*G06F 15/16* (2006.01)

(52) U.S. Cl.
USPC ............ 709/230; 709/203; 709/224; 715/744

(58) Field of Classification Search
USPC .......................................... 709/203, 230, 224
See application file for complete search history.

(56) References Cited

U.S. PATENT DOCUMENTS

| 6,584,404 | B1 * | 6/2003 | McBurney et al. | 701/482 |
| 7,085,577 | B1 * | 8/2006 | Katsuno et al. | 455/456.3 |
| 2004/0254724 | A1 * | 12/2004 | Mattila | 701/209 |
| 2008/0248810 | A1 * | 10/2008 | Obradovich | 455/456.1 |
| 2009/0055525 | A1 * | 2/2009 | Slepov et al. | 709/224 |
| 2009/0077546 | A1 * | 3/2009 | Huang et al. | 717/165 |
| 2009/0089296 | A1 * | 4/2009 | Stemeseder et al. | 707/10 |
| 2009/0097930 | A1 * | 4/2009 | Fogg | 408/211 |
| 2009/0238112 | A1 * | 9/2009 | Hong et al. | 370/328 |
| 2010/0114994 | A1 * | 5/2010 | Huang et al. | 707/811 |
| 2010/0257413 | A1 * | 10/2010 | Brunet et al. | 714/57 |
| 2010/0268831 | A1 * | 10/2010 | Scott et al. | 709/228 |

FOREIGN PATENT DOCUMENTS

| JP | 11-203303 | 7/1999 |
| JP | 2010-223691 | 10/2010 |
| WO | 2007070459 | 6/2007 |

OTHER PUBLICATIONS

First Office Action for Japanese Patent Application No. 2010-267483 Dated Mar. 5, 2013, 6 pgs.

* cited by examiner

*Primary Examiner* — Patrice Winder
*Assistant Examiner* — Eyob Hagos
(74) *Attorney, Agent, or Firm* — Turocy & Watson, LLP (57) ABSTRACT

A server device for use in a thin-client system includes a determination unit configured to determine whether or not an application program executed on the server device based on an input event from the client terminal has requested sensor information in a present environment of a device, an obtaining unit configured to, when the determination unit has determined the application program has requested sensor information, obtain sensor information in a present environment of the client terminal instead of obtaining sensor information in an present environment of the server device, and a transmission unit configured to cause the application program to run based on the sensor information on the client terminal obtained at the obtaining unit and transmits screen data created by the execution to the client terminal.

9 Claims, 9 Drawing Sheets

SERVER DEVICE IN THIN-CLIENT SYSTEM

CROSS-REFERENCE TO RELATED APPLICATIONS

This application is based upon and claims the benefit of priority from prior Japanese Patent Application No. 2010-267483, filed Nov. 30, 2010, the entire contents of which are incorporated herein by reference.

BACKGROUND OF THE INVENTION

1. Field of the Invention

The present invention relates to a server device for use in a screen-transfer thin-client system where a computer on which an application program runs differs physically from a computer operated by the user.

2. Description of the Related Art

In recent years, the use of web applications has been increasing in the field of personal computers (PCs) connectable to a communication network, such as the Internet, and mobile computers.

This is because web applications have the merit of enabling the user to use the applications only with a standard web browser without installing them, whereas traditionally the user installed applications on the user's computer and ran them.

Recently, a thin-client system has been attracting attention because it has an advantage in information security.

In the thin-client system, an application runs on a server and only its screen information is transferred to a client terminal. The terminal has no actual data in it. Therefore, for example, a person who takes their computer (mobile terminal) out of the company for use in a business situation has the merit of being at low risk of information leakage because there is no data in the terminal even if they should lose the terminal.

A recent mobile information device, such as a mobile phone or a smartphone, is normally equipped with various sensors, including an orientation sensor, a Global Positioning System (GPS) sensor, and an acceleration sensor. Therefore, some of the web applications which have been designed to offer convenient services using the sensors, such as map navigation, have started to attract people's attention.

A system which uses position information in web applications has been disclosed in, for example, International Publication No. WO 2007/070459.

In the conventional thin-client system, a web application that uses information from a sensor cannot be used directly.

The reason is as follows. In the thin-client system, a web browser on which a web application is running is functioning on a thin-client system server located far away from the user who has a client terminal. For example, when position information from a GPS sensor is used, even if the web application has obtained position information on the server and used it, it has no meaning to the user.

BRIEF SUMMARY OF THE INVENTION

Accordingly, it is an object of the present invention to provide a technique which enables a web application or the like running on a server device in a thin-client system to use sensor information on a thin-client terminal efficiently.

According to one aspect of the present invention, there is provided a server device for use in a thin-client system configured to execute an application program corresponding to an input event received from a client terminal and transmit screen data created based on the execution of the application program to the client terminal, the server device comprising: a determination unit configured to determine whether or not an application program executed on the server device based on an input event from the client terminal has requested sensor information in a present environment of a device; an obtaining unit configured to, when the determination unit has determined the application program has requested sensor information, obtain sensor information in a present environment of the client terminal instead of obtaining sensor information in an present environment of the server device; and a transmission unit configured to cause the application program to run based on the sensor information on the client terminal obtained at the obtaining unit and transmits screen data created by the execution to the client terminal.

According to the present invention, it is possible to provide a server device which enables a web application or the like running on a server in a thin-client system to use sensor information on a client terminal efficiently.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, embodiments of the invention will be explained.

Figure 1:
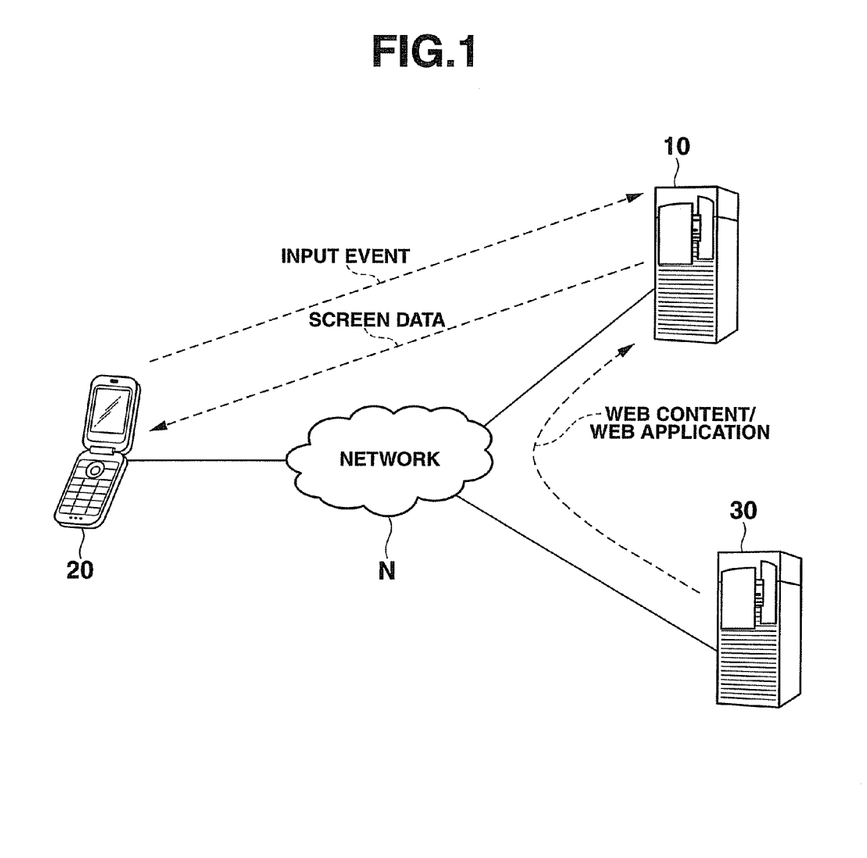
FIG. 1 shows an overall configuration of a thin-client system according to an embodiment of the invention.

FIG. 1 shows an overall configuration of a thin-client system according to an embodiment of the invention.

The thin-client system includes a thin-client system server 10 connected to a communication network N, such as the Internet, and client terminals (thin clients) 20 . . . connected to the communication network N. Various web servers 30 . . . are also connected to the communication network N.

For example, mobile terminals are used as the client terminals 20 in the embodiment.

Figure 2:
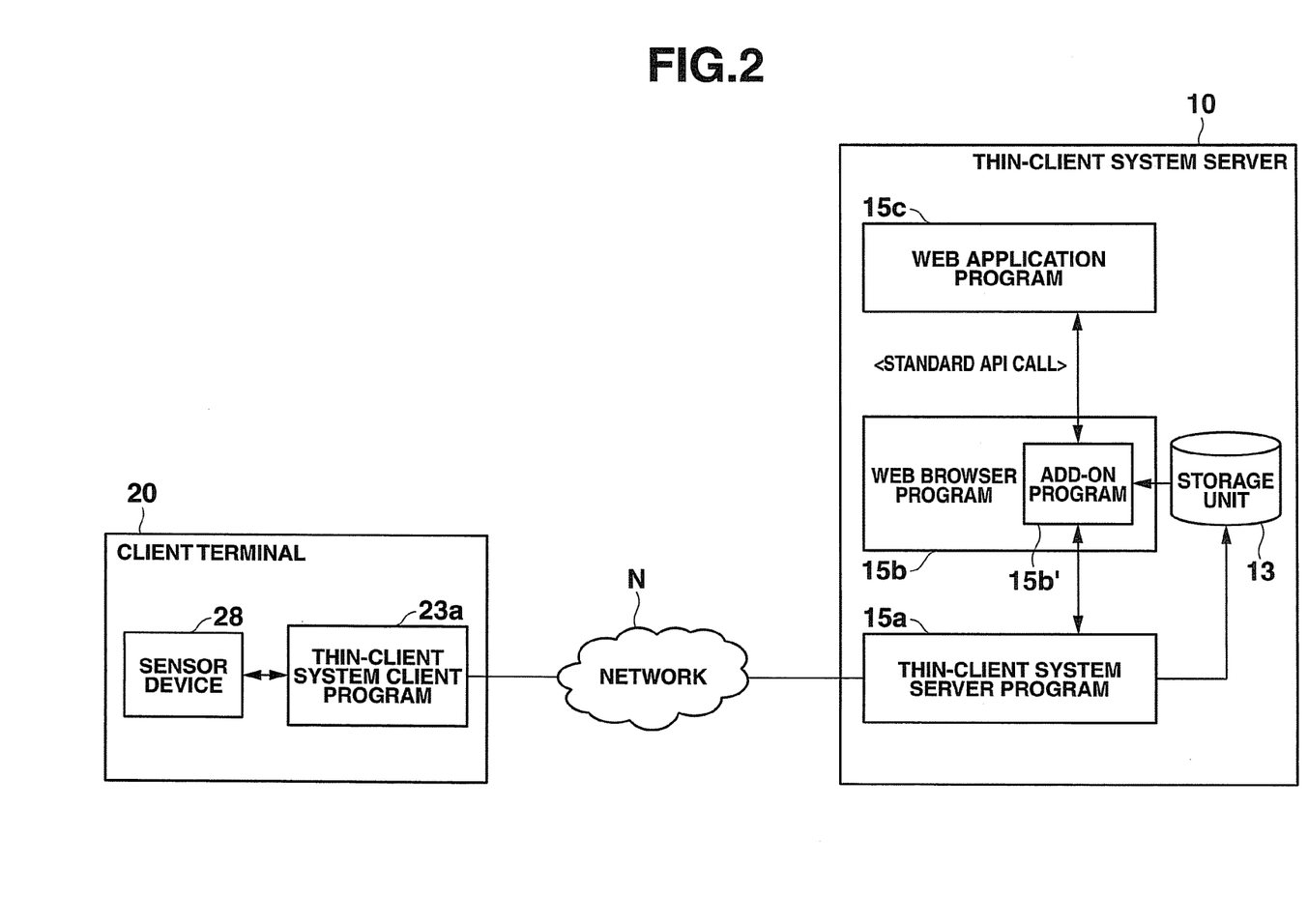
FIG. 2 shows a configuration of an operating program in a thin-client system server 10 and a client terminal 20 in the thin-client system.

FIG. 2 shows a configuration of an operating program in the thin-client system server 10 and a client terminal 20 in the thin-client system.

The thin-client system server 10 includes not only a thin-client system server program 15a that supervises the server's basic operation but also a plurality of application programs, including a web browser program 15b, a mail handling program, and a text creation program. These application programs are activated and perform their processes in the operation of the thin-client system server program 15a according to an input event signal produced by a user operation on the thin-client terminal 20 connected to the thin-client system server 10.

The client terminal 20, which includes a thin-client system client program 23a, operates according to an input signal corresponding to a user operation or a response signal from the thin-client system server 10.

In the thin-client system server 10, screen drawing data G created on a client virtual frame buffer 16 (see FIG. 3) is transferred to the accessing client terminal 20 as a result of the execution of an application program according to an input event signal from the client terminal 20.

Then, at the client terminal 20, the screen drawing data G transferred from the thin-client system server 10 is developed over a frame buffer 24 (see FIG. 4) and displayed on the display screen of a display unit 25.

Specifically, the client terminal (mobile terminal) 20 in the thin-client system has an input function according to a user operation on various keys or pointer buttons, an output function for an LCD display unit or the like, a wire or wireless communication function for connecting with a communication network N, such as a WAN or a LAN, as main functions. The client terminal 20 need not have at least the various application functions and data file management functions which the thin-client system server 10 has.

Data files created by various application processes activated and performed by the thin-client system server 10 according to an input event signal from the client terminal 20 are basically stored by user account or as shared files in the thin-client system server 10 or in a file server (not shown) connected to and managed by the server 10.

In a general thin-client system, when the web browser program 15b of the thin-client system server 10 is activated by an input event from the client terminal 20 and a web content or a web application program offered by a desired web server 30 on the communication network N is used, a web application program 15c taken into the thin-client system server 10 runs with the web browser program 15b.

Then, the web browser program 15b accepts an input event from the client terminal 20 via the thin-client system server program 15a and, in response to this, sends screen data of web content taken in according to the operation of the web application program 15c to the client terminal 20 via the thin-client system server program 15a.

Here, when the web application program 15c has the function of running on the basis of sensor information on the user side, such as position information or temperature information, a conventional web browser program has the function of taking in sensor information from the thin-client system server 10 on which the web browser program is running and responding to the web application program 15c, but does not have the function of requesting sensor information from the client terminal 20 via the thin-client system server program 15a and taking in sensor information from the client terminal 20.

Therefore, as shown in FIG. 2, there is provided an add-on program 15b' for requesting sensor information from the client terminal 20 via the thin-client system server program 15a upon a request of the web application program 15c for sensor information, taking in sensor information from the client terminal 20, and responding to the web application program 15c. This add-on program 15b' is added to the web browser program 15b which is caused to run on the thin-client system server 10 of the embodiment.

An "add-on" is a mechanism for expanding a web browser with a unique function. Most standard web browsers have this add-on mechanism.

The add-on program 15b' offers a standard application program interface (API) to the web application program 15c.

As for standard APIs, for example, the geolocation API (http://dev.w3.org/geo/api/spec-source.html) is available. Designing a program according to the API specification provides the merit of assuring the same operation even on a different browser.

The add-on program 15b' of the embodiment overwrites the standard API with a unique function. The add-on program 15b' is generally written in, for example, JavaScript (registered trademark). This is because almost all web browsers have normally been provided with a JavaScript execution environment. JavaScript enables an overwrite method to be used. This method enables the API to be overwritten easily.

Figure 3:
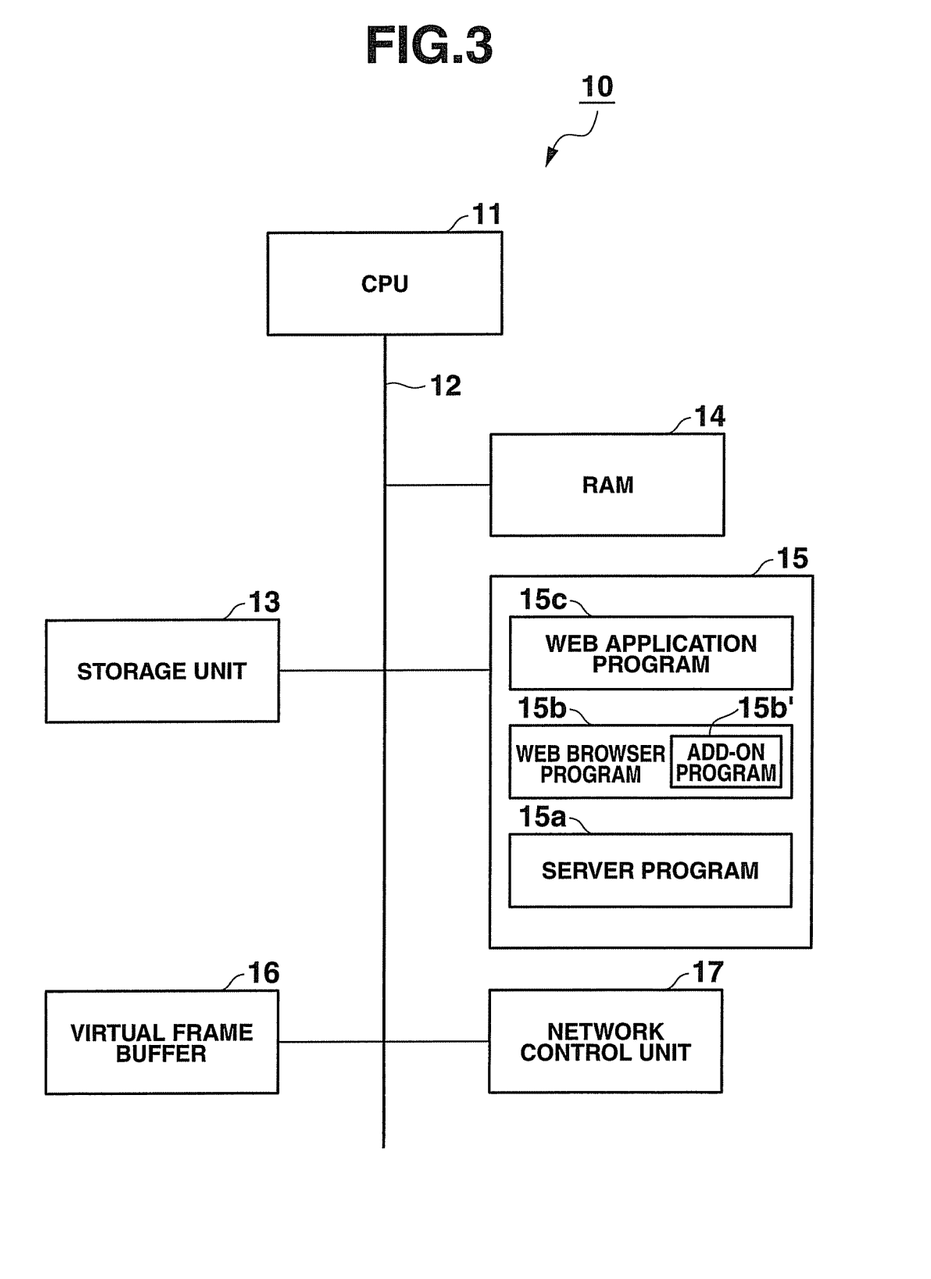
FIG. 3 is a block diagram showing a circuit configuration of the thin-client system server 10 in the thin-client system.

FIG. 3 is a block diagram showing a circuit configuration of the thin-client system server 10 in the thin-client system.

The thin-client system server 10 includes a CPU 11 as a computer. Connected via a bus 12 to the CPU 11 are a storage device 13, a RAM 14, a program storage unit 15, a virtual frame buffer 16, and a network control unit 17.

The CPU 11 controls the operations of various parts of the circuit using the storage unit 13 and RAM 14 as a work area according to various server control programs, including the thin-client system server program 15a, web browser program 15b which has the add-on program 15b' overwritten on the standard API, web application program 15c, and other application programs stored in the program storage unit 15 and programs externally read and stored in the storage unit 13. Various programs are activated and executed in cooperation with one another according to an input event signal corresponding to a user operation on the client terminal 20 received via the network control unit 17.

In the thin-client system server 10, various items of data created using the RAM 14 according to an application program executed in response to the input event signal from the client terminal 20 are stored in the storage unit 13 so as to correspond to, for example, the user's ID.

In addition, client screen drawing data G is created using the virtual frame buffer 16 and is compressed. Then, the resulting data is transferred from the network control unit 17 to the client terminal 20 that has input the event. The client terminal 20 then displays the data.

Figure 4:
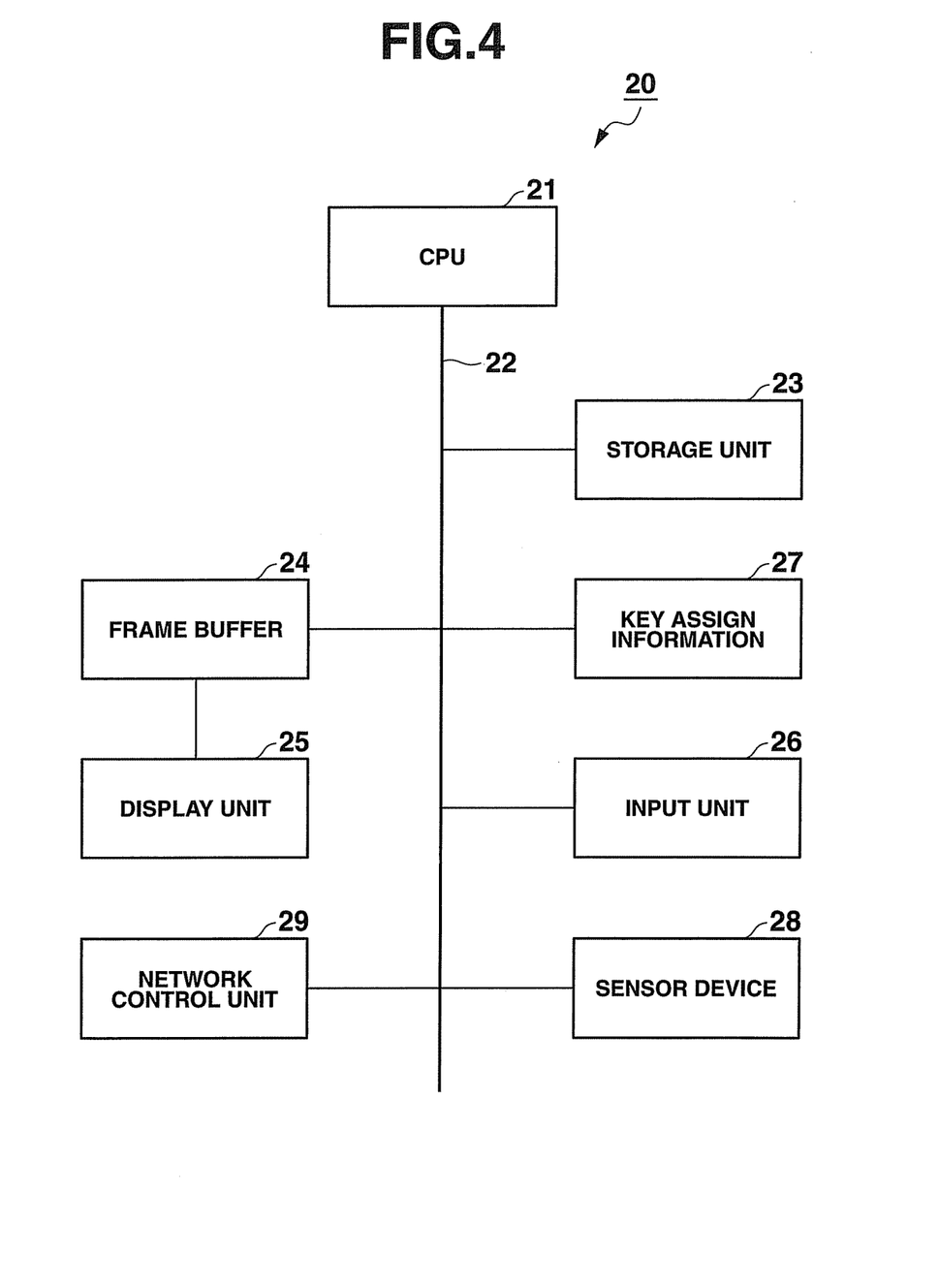
FIG. 4 is a block diagram showing a circuit configuration of the client terminal 20 in the thin-client system.

FIG. 4 is a block diagram showing a circuit configuration of the client terminal 20 in the thin-client system.

The client terminal 20 includes a CPU 21 as a computer. A storage unit 23 and a frame buffer 24 are connected to the CPU 21 via a bus 22. Screen drawing data G written in the frame buffer 24 is output to the display unit 25, which displays the data.

Further connected to the CPU 21 via the bus 22 are an input unit 26 that includes various keys and pointer buttons, a key assign information memory 27 for setting an input code corresponding to the key or pointer input on the input unit 26, a sensor device that includes various sensors, including a GPS sensor (for detecting positions), an acceleration sensor (for counting steps), a temperature sensor, a humidity sensor, and a barometric sensor, and a network control unit 29 for communicating with an access point on the communication network N.

The CPU 21 controls the operations of various parts of the circuit using the storage unit 23 or key assign information memory 27 as a work area according to the thin-client system client program 23a previously stored in the storage unit 23 or externally loaded in the storage unit 23. The thin-client system client program 23a is activated and executed according to a key signal or a pointer move signal from the input unit 26, a sensor signal from the sensor device 28, an application response signal or screen drawing data G from the thin-client system server 10 received via the network control unit 29.

In the client terminal 20, an application program in the thin-client system server 10 is run according to the input event signal from the input unit 26 to create screen drawing data G. The screen drawing data G received from the server 10 is decompressed and written to the frame buffer 24 and is displayed on the display unit 25.

In the thin-client system configured as described above, the CPU 11 controls the operations of various parts of the circuit according to instructions written in the server control programs (thin-client system server program 15a/web browser program 15b/add-on program 15b'/web application program 15c) so as to cause software and hardware to operate in cooperation with each other, thereby causing the thin-client system server 10 to realize functions described below.

In addition, the CPU 21 controls the operations of various parts of the circuit according to instructions written in the client control program (thin-client system client program 23a) so as to cause software and hardware to operate in cooperation with each other, thereby causing the client terminal 20 to realize functions described below.

Next, the operation of the thin-client system with the above configuration will be explained.

A concrete example of the operation of the embodiment will be explained below. The web browser program 15b of the thin-client system server 10 is activated according to a user operation on the client terminal 20. A web application program 15c downloaded from a user-specified web server 30 according to the operation of the web browser program 15b is executed. The web application program 15c, which offers navigation services to the user, requires position information on the user periodically.

Figure 5:
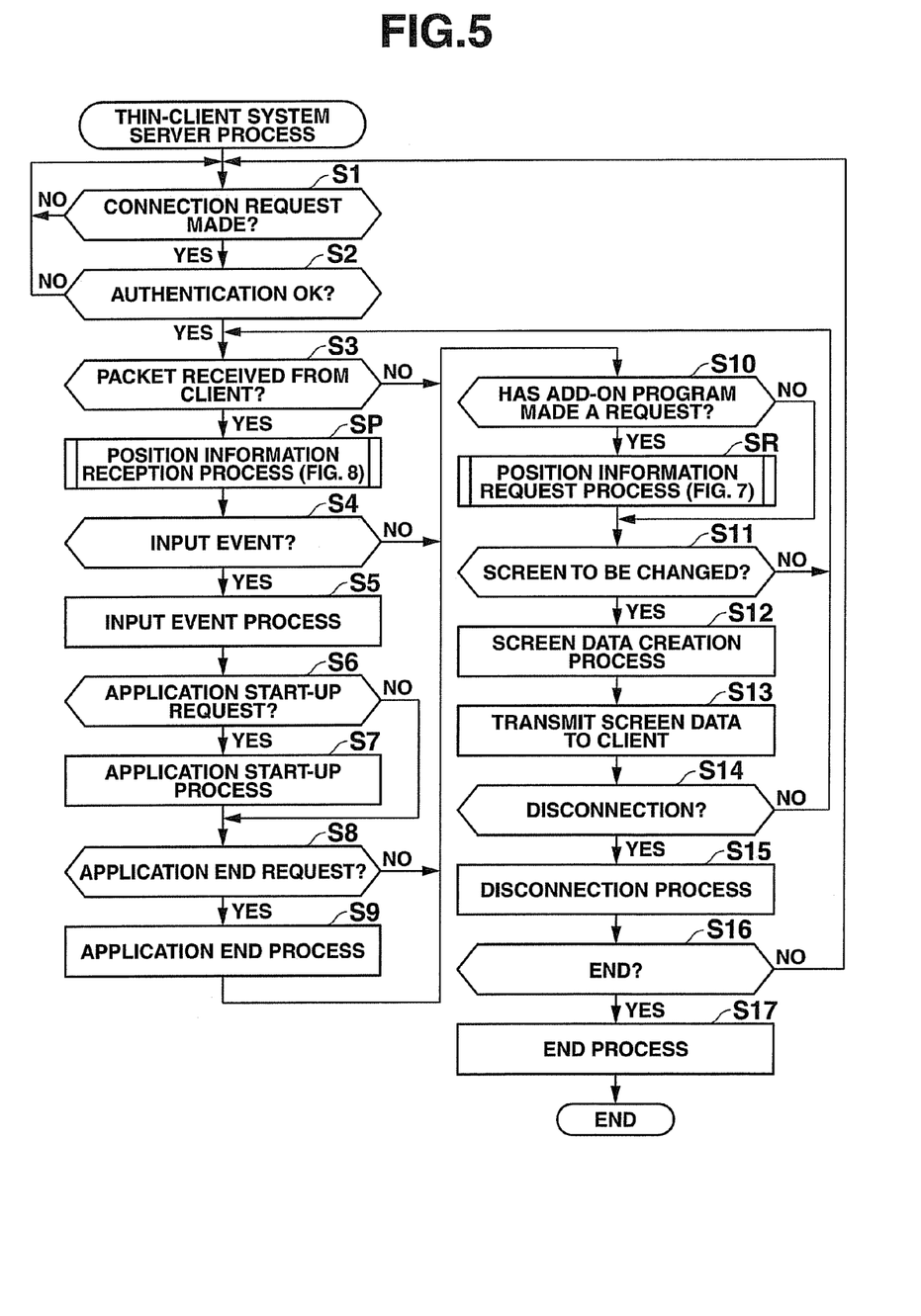
FIG. 5 is a flowchart to explain a thin-client system server process performed by a thin-client system server program 15a in the thin-client system server 10.

FIG. 5 is a flowchart to explain a thin-client system server process performed by the thin-client system server program 15a in the thin-client system server 10.

Figure 6:
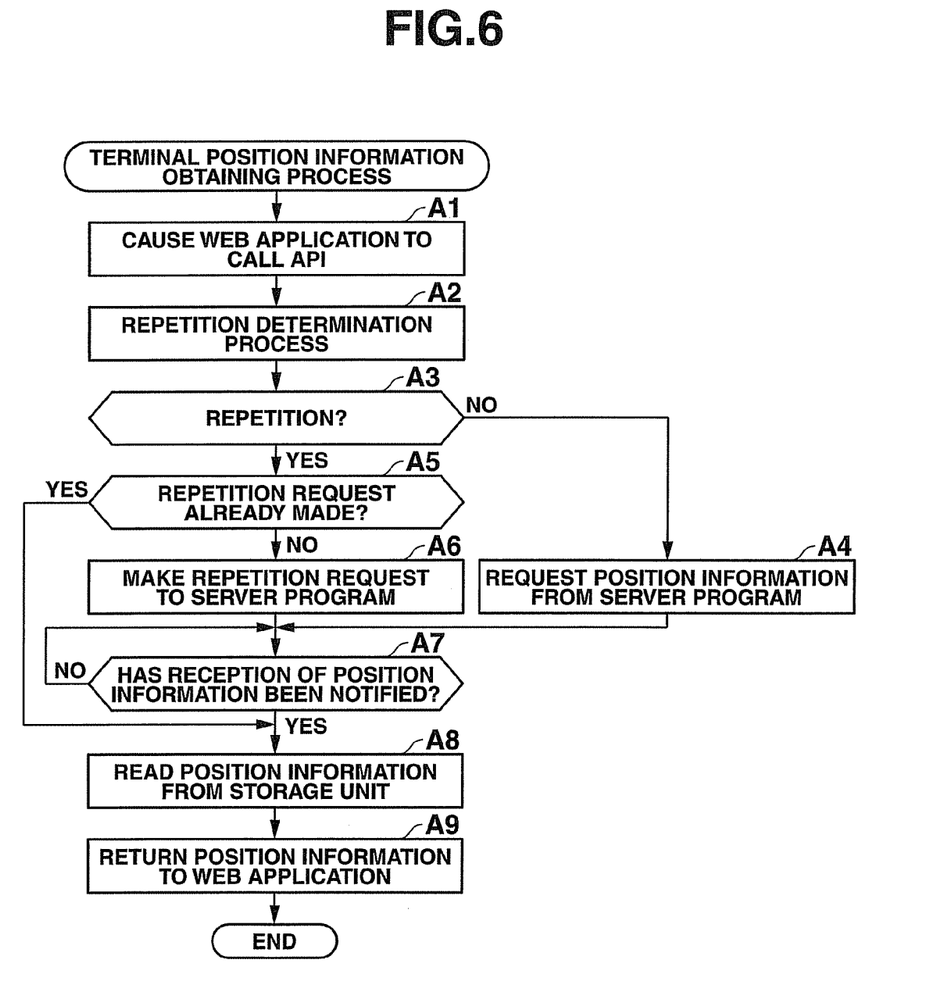
FIG. 6 is a flowchart to explain a terminal position information obtaining process by an add-on program 15b' added to a standard API of a web browser program 15b in the thin-client system server 10.

FIG. 6 is a flowchart to explain a terminal position information obtaining process by the add-on program 15b' added to a standard API of the web browser program 15b in the thin-client system server 10.

Figure 7:
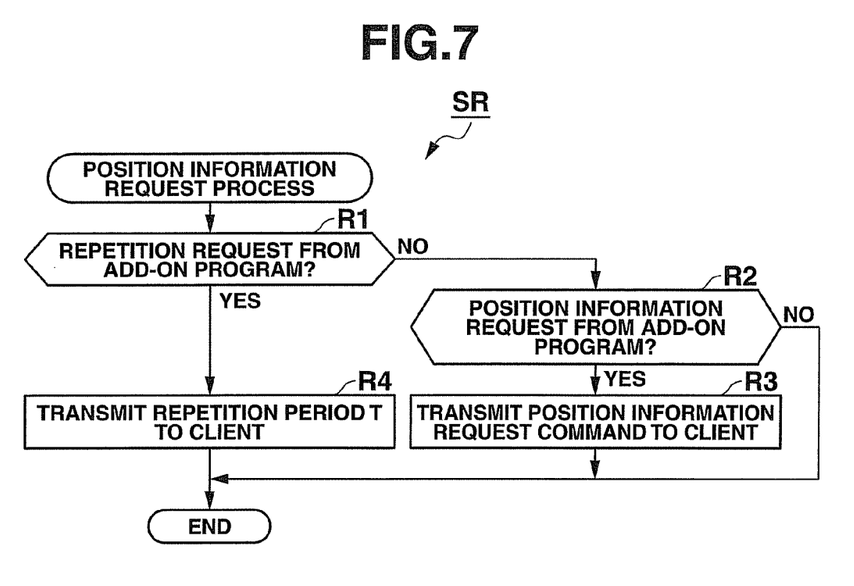
FIG. 7 is a flowchart to explain a position information request process in the thin-client system server process (FIG. 5) performed by the thin-client system server 10.

FIG. 7 is a flowchart to explain a position information request process in the thin-client system server process (FIG. 5) performed by the thin-client system server 10.

Figure 8:
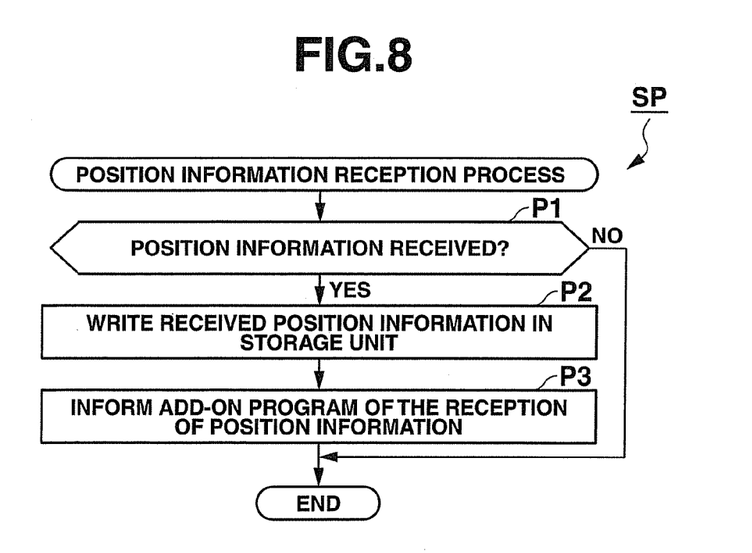
FIG. 8 is a flowchart to explain a position information reception process in the thin-client system server process (FIG. 5) performed by the thin-client system server 10.

FIG. 8 is a flowchart to explain a position information reception process in the thin-client system server process (FIG. 5) performed by the thin-client system server 10.

Figure 9:
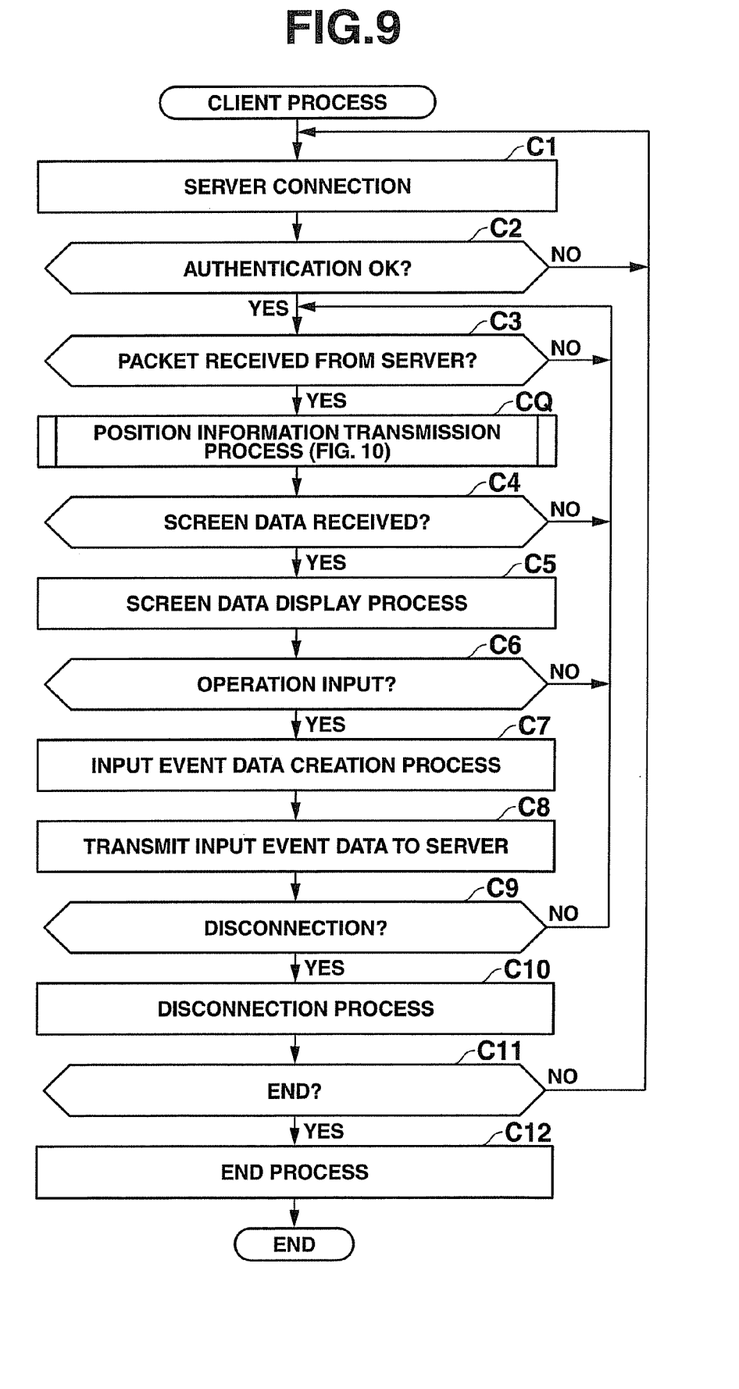
FIG. 9 is a flowchart to explain a client process performed by a thin-client system client program 23a in the client terminal 20.

FIG. 9 is a flowchart to explain a client process performed by the thin-client system client program 23a in the client terminal 20.

Figure 10:
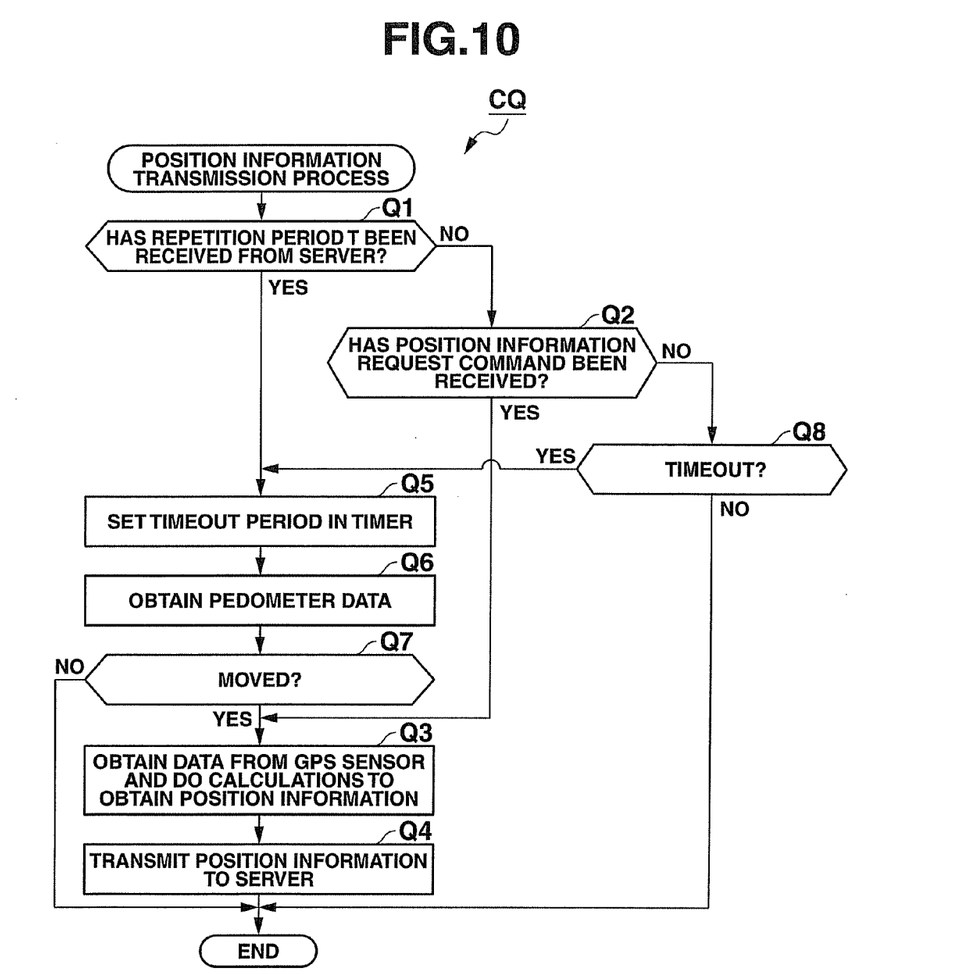
FIG. 10 is a flowchart to explain a position information transmission process in the client process (FIG. 9) performed by the client terminal 20.

FIG. 10 is a flowchart to explain a position information transmission process in the client process (FIG. 9) performed by the client terminal 20.

When a server connection request including the user and terminal ID is transmitted to the thin-client system server 10 in response to a start-up operation of the client terminal 20 (step C1), it is determined in a server process of the thin-client system server 10 whether or not the authentication of the user and terminal ID required for connection is OK (step S1 [Yes] →S2).

Then, when it has been determined that the authentication of the user and terminal ID is OK (Yes in step S2), the client terminal 20 is informed that the authentication is OK and connection between the client terminal 20 and thin-client system server 10 is established (Yes in step C2).

At this time, initial display screen drawing data G is created in the virtual frame buffer 16 at the thin-client system server 10. Then, the data G is compressed and transmitted to the client terminal 20 identified by the terminal ID (steps S11 to S13).

Then, at the client terminal 20, the initial display screen drawing data G received from the thin-client system server 10 is decompressed and extracted on the frame buffer 24. The resulting data is displayed on the display unit 25 (step C3 [Yes]→C4 [Yes]→C5).

When a web browser start-up request is transmitted as an input event to the thin-client system server 10 according to a user operation on the client terminal 20 (step C6 [Yes] thin-C7, C8), the web browser program 15b is activated according to the received input event at the thin-client system server 10 (step S3 [Yes]→S4 [Yes]→S5, S6 [Yes]→S7).

Then, the web application program 15c is downloaded from the web server 30 that offers the user-specified navigation service according to the operation of the activated web browser program 15b. Then, when the web application program 15c is activated, the standard API on the web browser (15b) is called to obtain position information according to the operation of the web application program 15c.

When the API has been called according to the operation of the web application program 15c in a terminal position information obtaining process (see FIG. 6) performed by the add-on program 15b' added to the standard API on the web browser (15b) (step A1), an API call repetition determination process is performed (step A2).

The API call repetition determination process is such that, for example, the average and variance of time intervals between an n number of calls most recently made in the API call are determined and, if a variation in the time interval is within a specific value, it is determined that the call has been repeated (step A2), and if it is determined that the call has not been repeated (No in step A3), a position information request is transmitted to the thin-client system server program 15a (step A4).

Then, a determination of whether or not the reception of position information has been notified according to a thin-client system server process (see FIG. 5) is waited for (step A7).

When it is determined in the thin-client system server process (see FIG. 5) that a position information request transmitted according to a terminal position information obtaining process (see FIG. 6) by the add-on program 15' has been received (Yes in step S10), control is passed to a position information request process in FIG. 7 (step SR) and a position information request command is transmitted to the client terminal 20 identified by the terminal ID (step R2 [Yes] →R3).

When the client terminal 20 has received the position information request command transmitted from the thin-client system server 10 (Yes in step C3), control is passed to a position information transmission process in FIG. 10 (step CQ) and position information is obtained by an operation based on sensor data from a GPS sensor provided on the sensor device 28 (step Q2 [Yes]→Q3). Then, the obtained position information is transmitted to the thin-client system server 10 (step Q4).

When the thin-client system server 10 has received the position information transmitted from the client terminal 20 (Yes in step S3), control is passed to a position information reception process in FIG. 8 (step SP) and the received position information is written in the storage unit 13 (step P1 [Yes] →P2). Then, the add-on program 15b' (see FIG. 6) on the web browser (15b) is informed of the reception of the position information (step P3).

Then, in a terminal position information obtaining process (see FIG. 6) by the add-on program 15b', it is determined that the reception of position information has been notified according to the thin-client system server process (Yes in step A7) and position information on the client terminal 20 stored in the storage unit 13 is read (step A8). Then, the position information on the client terminal 20 identified by the terminal ID read from the storage unit 13 is given to the web application program 15c which has called the API (step A9).

Then, according to the operation of the web application program 15c, navigation data corresponding to the position information on the client terminal 20 is downloaded from the web server 30 and screen drawing data G corresponding to the navigation data is created on the virtual frame buffer 16 (step S21 [Yes]→S12). Then, the navigation screen drawing data created on the virtual frame buffer 16 is transmitted to the client terminal 20 identified by the terminal ID (step S13).

Then, the client terminal 20 receives the navigation screen drawing data G corresponding to the position information on the client terminal 20 itself transmitted from the thin-client system server 10 (step C3 [Yes]→C4 [Yes]) and the data is written in the frame buffer 24 and displayed on the display unit 15 (step C5).

Therefore, even with the thin-client system, position information requested by the API of the web browser (15b) according to the web application program 15c in the navigation service downloaded to the thin-client system server 10 can be returned as position information measured with the GPS sensor, the sensor device 28 of the client terminal 20, which enables a navigation service according to the position of the user of the client terminal 20 to be offered.

That is, even with the thin-client system, a web application service corresponding to sensor information on the client terminal 20 itself can be used.

Thereafter, when the API has been called again according to the operation of the web application program 15c (step A1) in the terminal position information obtaining process (seen FIG. 6) by the add-on program 15b' on the web browser (15b), if the API call repetition determination process has determined that the call has been repeated (steps A2, A3 [Yes]), it is determined according to the preceding repetition determination process whether or not a repetition request has been made (step A5).

If it has been determined that a repetition request has not been made (No in step A5), a repetition request is transmitted to the thin-client system server program 15a (step A6).

Then, a determination of whether or not the reception of position information has been notified according to the thin-client system server process (see FIG. 5) is waited for (step A7).

If in the thin-client system server process (see FIG. 5), it has been determined that a repetition request has been received according to the terminal position information obtaining process (see FIG. 6) by the add-on program 15b' (Yes in step S10), control is passed to a position information request process in FIG. 7 (step SR) and a repetition period T is transmitted to the client terminal 20 identified by the terminal ID (step R1 [Yes]→R4).

When the client terminal 20 has received the repetition period T transmitted from the thin-client system server 10 (Yes in step C3), control is passed to a position information transmission process in FIG. 10 (step CQ) and the repetition period T is set as timeout period T of a timer (step Q1 [Yes] →Q5).

Then, pedometer data calculated on the basis of sensor data of the acceleration sensor provided on the sensor device 28 is obtained (step Q6) and is compared with, for example, the preceding obtained value, thereby determining whether or not the client terminal 20 itself has moved (step Q7).

If it has been determined that the client terminal 20 itself has moved (Yes in step Q7), new position information is obtained by calculations based on sensor data from the GPS sensor provided on the sensor device 28 (step Q3) and is transmitted to the thin-client system server 10 (step Q4).

When the thin-client system server 10 has received the new position information transmitted from the client terminal 20 (Yes in step S3), control is passed to the position information reception process in FIG. 8 (step SP) and the received position information is overwritten in the storage unit 13 (step 21 [Yes]→P2). Then, the add-on program 15b' (see FIG. 6) on the web browser (15b) is informed of the reception of the position information (step P3).

On the other hand, if in the position information transmission process (see FIG. 10) at the client terminal 20, it has been determined that the client terminal 20 itself has not moved (No in step Q7), neither the position information obtaining process from the GPS sensor in step Q3 nor the position information transmission process to the thin-client system server 10 in step Q4 is performed.

After this, in the position information transmission process at the client terminal 20, it is determined whether or not the client terminal has moved in accordance with the pedometer data (steps Q5 to Q7) each time the passage of timeout period T set in the timer is determined (Yes in step Q8) until a position information request command according to the position information request process (see FIG. 7) at the thin-client system server 10 has been newly received. Then, only when it has been determined that the client terminal 20 itself has moved (Yes in step Q7), new position information obtained on the basis of the GPS sensor is transmitted to the thin-client system server 10 (steps Q3, Q4).

Accordingly, during the operation of the timer at the client terminal 20, only when the client terminal 20 has moved, the process of obtaining position information from the GPS sensor and the process of transmitting the position information are performed. Therefore, the power consumption can be reduced by removing unnecessary processes at the client terminal 20.

Then, position information on the client terminal 20 stored in the storage unit 13 according to the position information reception process (see FIG. 8) at the thin-client system server 10 is overwritten with new position information during the operation of the timer at the client terminal 20 only when the client terminal 20 has moved.

In the terminal position information obtaining process (see FIG. 6) by the add-on program 15b' on the web browser (15b), if it has been determined that the reception of position information has been notified according to the position information reception process (see FIG. 8) in the thin-client system server process (Yes in step A7) after a repetition request has been transmitted to the thin-client system server program 15a (step A6), position information on the client terminal 20 stored in the storage unit 13 is read (step A8). Then, the position information on the client terminal 20 identified by the terminal ID read from the storage unit 13 is given to the web application program 15c that has called the API (step A9).

In addition, when the API has been called according to the operation of the web application program 15c (step A1), if it has been determined that the API call repetition determination process has determined that the call has been repeated (steps A2, A3 [Yes]) and that a repetition request has been made (Yes in step A5), position information on the client terminal 20 stored in the storage unit 13 is directly read (step A8) without making a request to the thin-client system server program 15a and the position information is given to the web application program 15c that has called the API (step A9).

Then, according to the operation of the web application program 15c, navigation data corresponding to new position information resulting from the movement of the client terminal 20 is downloaded from the web server 30 and screen drawing data G corresponding to the navigation data is created on the virtual frame buffer 16 (step S21 [Yes]→S12). Then, the navigation screen drawing data G created on the virtual frame buffer 16 is transmitted to the client terminal 20 identified by the terminal ID (step S13).

Then, the client terminal 20 receives the navigation screen drawing data G corresponding to position information resulting from the movement of the client terminal 20 itself transmitted from the thin-client system server 10 (step C3 [Yes] →C4 [Yes]). Then, the data G is written in the frame buffer 24 and displayed on the display unit 15 (step C5).

Accordingly, position information requested repeatedly by the API of the web browser (15b) according to the web application program 15c in a navigation service downloaded into the thin-client system server 10 can be returned efficiently as position information measured by the GPS sensor, the sensor device 28 of the client terminal 20, each time position information is requested, without making a request to the client terminal 20 via the position information request process in the thin-client system server process. Therefore, navigation services corresponding to the moving position of the user of the client terminal 20 can be received.

That is, even with the thin-client system, web application services corresponding to sensor information on the client terminal 20 itself can be received efficiently.

In other words, even in a screen transfer thin-client system where a computer (thin-client system server 10) on which a web application runs differs physically from a computer (client terminal 20) the user has at hand, the web application can use sensor information on the client terminal 20.

Thereafter, if the thin-client system server 10 has received an input event that specifies the end of the web browser according to a user operation on the client terminal 20 (step S3 [Yes]→S4 [Yes]→S5, S8 [Yes]), the operation based on the web browser program 15b is terminated and access to web server 30 that offers the navigation services is prevented (step S9).

Then, in the client terminal 20, if it has determined that a disconnection instruction has been input (Yes in step C9), the process of making a disconnection from the thin-client system server 10 is performed (step C10). In addition, if it has been determined that an end instruction has been input (Yes in step C11), the series of thin-client processes is terminated (step C12).

Furthermore, in the thin-client system server 10, if it has been determined that a disconnection request has been received from the client terminal 20 (Yes in step S14), the process of making a disconnection from the client terminal 20 is performed (step S15).

Then, if it has been determined that an end instruction has been input according to a user operation on the thin-client system server 10 itself (Yes in step S16), the series of thin-client system server processes is terminated (step C17).

Accordingly, with the thin-client system configured as described above, the sensor information obtaining API on the web browser program 15b in the thin-client system server 10 is overwritten with the add-on program 15b' which is caused to have the function of making a request to the client terminal 20 for sensor information via the operation of the thin-client system server program 15a when the API is called according to the operation of the web application program 15c, taking in sensor information transmitted from the client terminal 20 in response to the request, and returning the sensor information to the web application program 15c.

Therefore, while a general web application program 15c running on the thin-client system server 10 is caused to remain unchanged, the web application (15c) can obtain sensor information corresponding to the request from the client terminal 20. Accordingly, even a terminal user of the thin-client system can obtain a navigation screen according to the terminal position by using directly, for example, a web application (15c) that offers navigation services.

Furthermore, in the thin-client system with the above configuration, sensor information received from the client terminal 20 according to the operation of the thin-client system server program 15a is stored in the storage unit 13 and taken in according to the add-on program 15b'. The add-on program 15b' is caused to further have the function of, when it has been determined that a call for the sensor information obtaining API made by the web application program 15c has been repeated, requesting the client terminal 20 to obtain sensor information repeatedly via the operation of the thin-client system server program 15a, then taking in directly sensor information on the client terminal 20 stored in the storage unit 13, and returning the sensor information to the web application program 15c.

Therefore, when the sensor information obtaining API on the web browser program 15b is called repeatedly by the web application program 15c, the web application (15c) can obtain sensor information on the client terminal 20 in response to the request without requesting sensor information from the client terminal 20 via the operation of the thin-client system server program 15a each time the API is called.

The methods of the individual processes performed by the thin-client system described in the embodiments, that is, the individual methods, including the server process by the thin-client system server 10 shown in the flowchart of FIG. 5, the terminal position information obtaining process by the add-on program 15b' added to the web browser program 15b of the thin-client system server 10 shown in the flowchart of FIG. 6, the position information request process in the thin-client system server process (see FIG. 5) shown in the flowchart of FIG. 7, the position information reception process in the thin-client system server process (see FIG. 5) shown in the flowchart of FIG. 8, the client process by the client terminal 20 shown in the flowchart of FIG. 9, and the position information transmission process in the client process (see FIG. 9) shown in the flowchart of FIG. 10, can be stored in an external recording medium, such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Then, the mediums can be delivered. The computers (CPU 11, 21) of the thin-client system server 10 and client terminal 20 load the programs stored in the external recording media into the storage units (13, 33). The computers are controlled by the read programs, thereby realizing the function of taking in sensor information from the thin-client terminal 20 that uses directly the existing web application program 15c explained in the embodiment, which enables the same processes in the aforementioned methods to be carried out.

Furthermore, the programs which realize the above methods can be transferred in the form of program code through a communication network (N). The program data can be loaded from a computer device (program server) connected to the communication network (N) into the storage units (13, 23), thereby realizing the function of taking in sensor information from the thin-client terminal 20 that uses directly the existing web application program 15c explained above.

The present invention is not limited to the above embodiments and, on the basis of available skills in the present or future implementation phase, may be practiced or embodied in still other ways without departing from the spirit or character thereof. The embodiments include inventions of different stages and therefore various inventions can be extracted by combining suitably a plurality of structural requirements disclosed in the embodiments. For example, even if some are removed from all of the structural requirements shown in the embodiments or some structural requirements are combined in a different mode, the resulting configuration can be extracted as an invention, provided that the subject to be achieved by the invention is accomplished and the effect of the invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server device for use in a thin-client system configured to execute an application program corresponding to an input event received from a client terminal and transmit screen data created based on the execution of the application program to the client terminal, the server device comprising:
a determination unit configured to, when an application program executed on the server device based on an input event from the client terminal has requested sensor information in a present environment of the client terminal, determine whether or not the request is a repetition request that requires the sensor information repeatedly;
an obtaining unit configured to, when the determination unit has determined that the request is the repetition request, obtain sensor information in a present environment of the client terminal repeatedly, by transmitting a repetition request that requires the client terminal to transmit the sensor information repeatedly in predetermined intervals of time and sequentially receiving the sensor information transmitted from the client terminal repeatedly; and
a transmission unit configured to, every time the sensor information is obtained repeatedly by the obtaining unit, cause the application program to run based on the sensor information and transmit screen data created by the execution to the client terminal.

2. The server device according to claim 1, wherein the determination unit is configured to determine whether or not the request is the repetition request based on whether or not a request calling for sensor information from the application program has been repeated within a predetermined period of time.

3. The server device according to claim 1, wherein:
the application program includes an add-on program, and
the determination unit determines whether or not the add-on program has requested sensor information.

4. The server device according to claim 1, wherein the request for sensor information in the present environment is a request for sensor information that indicates the position where the device is at present.

5. A thin-client system comprising:
a server device configured to execute an application program corresponding to an input event received from a thin-client terminal device and transmit screen data created according to the application program to the thin-client terminal device and;
a thin-client terminal device configured to transmit an input event corresponding to a user operation to the server device and display screen data received from the server device in response to the input event,
the server device comprising
a sensor information request unit configured to transmit a request for sensor information to the thin-client terminal device in response to a call from an application program executed according to an input event from the thin-client terminal device, and
a sensor information obtaining unit configured to receive sensor information from the thin-client terminal device and return the sensor information as sensor information on the thin-client terminal device to the calling application program, and
the thin-client terminal device comprising
a request reception unit configured to receive a request for sensor information transmitted from the server device,
a sensor information detection unit configured to detect sensor information held by the thin-client terminal device in response to the request for sensor information received by the request reception unit, and
a sensor information transmission unit configured to transmit sensor information detected by the sensor information detection unit to the server device, wherein,
in the server device,
the sensor information request unit comprises
a repetition determination unit configured to determine whether or not a call from the application program executed according to an input event from the thin-client terminal device has been repeated within a predetermined period of time, and
a repetition determination coping unit configured to, when the repetition determination unit has determined that a call from the application program has been repeated, transmit a repetition request for sensor information to the thin-client terminal device only when it has been determined for the first time that a call has been repeated, without transmitting a request for the second and later times, and the sensor information obtaining unit receives and stores sensor information transmitted from the thin-client terminal device and returns the stored sensor information as sensor information on the thin-client terminal device to the calling application program and in the thin-client terminal device, the sensor information detection unit comprises a repetition request determination configured to determine whether or not a request for sensor information received by the request reception unit has been repeated, and a repetition detection unit configured to, when the repetition request determination unit has determined that the request for sensor information has been repeated, detect sensor information held by the thin-client terminal device at predetermined intervals of time.

6. The thin-client system according to claim 5, wherein:

the application program executed on the server device includes an add-on program, and the sensor information request unit and the sensor information obtaining unit function according to a process based on the add-on program.

7. The thin-client system according to claim 5, wherein:

the thin-client terminal device comprises a move determination unit configured to determine whether or not the thin-client terminal device itself has moved, and the repetition detection unit, when the repetition request determination unit has determined that the request for sensor information has been repeated, causes the move determination unit to determine at predetermined intervals of time whether or not the terminal device itself has moved and, only when the move determination unit has determined that the terminal device has moved, detects sensor information held by the terminal device.

8. A non-transitory computer-readable storage medium having program code stored thereon for controlling a computer of a server device for use in a thin-client system which executes an application program corresponding to an input event received from a client terminal and transmits screen data created based on the execution of the application program to the client terminal, the program code comprising:

determining, when an application program executed on the server device based on an input event from the client terminal has requested sensor information in a present environment of the client terminal, whether or not the request is a repetition request that requires the sensor information repeatedly;

obtaining, when it is determined that the request is the repetition request, sensor information in a present environment of the client terminal repeatedly, by transmitting a repetition request that requires the client terminal to transmit the sensor information repeatedly in predetermined intervals of time and sequentially receiving the sensor information transmitted from the client terminal repeatedly; and causing, every time the sensor information is obtained repeatedly, the application program to run based on the sensor information and transmit screen data created by the execution to the client terminal.

9. The server device according to claim 1, wherein the obtaining unit is configured to, when the determination unit has determined that the request is the repetition request, transmit the repetition request to the client terminal when the determination is made for the first time, without transmitting a request for the second and later times, and repeatedly obtain the sensor information which is repeatedly detected by the client terminal has received the repetition request.

* * * * *